United States Patent [19]

Allen

[11] 3,808,064

[45] Apr. 30, 1974

[54] POTENTIATING METHOD AND COMPOSITION

[75] Inventor: Robert A. Allen, Tonawanda, N.Y.

[73] Assignee: Allied Chemical Corporation, New York, N.Y.

[22] Filed: Jan. 24, 1969

[21] Appl. No.: 802,307

[52] U.S. Cl.................... 149/109, 149/110, 102/31
[51] Int. Cl............................................... C06c 9/00
[58] Field of Search............ 149/109, 110; 252/426; 246/487; 102/31

[56] References Cited
UNITED STATES PATENTS

| | | | |
|---|---|---|---|
| 3,309,251 | 3/1967 | Audrieth et al................... | 149/92 X |
| 3,475,239 | 10/1969 | Fearon et al....................... | 149/109 |

*Primary Examiner*—Stephen J. Lechert, Jr.
*Attorney, Agent, or Firm*—Arthur J. Plantamura; Jonathan Plaut

[57] ABSTRACT

This invention relates to the potentiating effect of aliphatic diamines on the reaction of potassium permanganate and an organic compound.

10 Claims, No Drawings

POTENTIATING METHOD AND COMPOSITION

This invention relates to the potentiating effect of aliphatic diamines, specifically, in one embodiment of the invention, 1,2-ethylene diamine, on the reaction of potassium permanganate and an organic compound, such as a polyol, e.g. ethylene glycol, glycerine, etc.

In a number of applications, the speeding up of such a reaction as just described by the use of such a potentiating effect, is desirable. For example, it has become necessary to have an easily assembled and effective signaling device to demark the movement and, preferably, location of men or machines in warfare, as well as for other purposes such as security of the home. Especially in jungle or otherwise difficult terrain, where the movement of troops may be hidden by foliage or by night movement, such an indicative device is desirable. Such devices have been proposed in the past, but they have suffered from a number of deficiencies, including: early or lack of detonation because of faulty design, especially in the placement of the puncturing member; lack of design features allowing for random deployment dispersion over a terrain from the air, or by other method without need of special implanting of the device for proper operation; or comparative slowness of the reaction causing detonation.

It is therefore an object of this invention to add a constituent in the reaction of an oxidizer and an organic compound to cause potentiating of said reaction.

It is further an object of this invention to potentiate the reaction of potassium permanganate and a polyol such as ethylene glycol or glycerine. We provide an easily assembled, reliable explosive signaling device to meet the need previously mentioned.

These and other objects and advantages of this invention will become more apparent upon reading the following detailed disclosure.

This invention generally relates to the addition of aliphatic diamines to the reaction of an oxidizer and an organic compound. More specifically, this invention relates to the potentiating effect of 1,2-ethylene diamine on the reaction of potassium permanganate and an organic compound, for example, a polyol such as ethylene glycol or glycerine, pyrogallol, gallic acid, benzaldehyde, formaldehyde, 2,4-pentanedione, acetone, aniline, hexamethylenetetramine, and the like.

The invention will now be described in greater detail with relation to the following specific example. It is understood that the invention is illustrated by said example, but only limited by the scope of the claims which follow.

The reaction between finely ground potassium permanganate, ground to 80 mesh or less, and glycerine occurs in about greater than four seconds at ambient conditions, measuring from the point of first intermixture of the two components to the flame point. In comparison, mixture of like quantities of (1) potassium permanganate and (2) 1,2-ethylene diamine and polyol causes the reaction to occur in less than one second. Where the components of (2) in the preceding sentence are in the ratio of 95 percent polyol and 5 percent 1,2-ethylene diamine, the reaction as defined occurs generally in about 750 milliseconds at ambient conditions. The proportions of diamine and polyol may be varied, but the diamine component of the diamine/polyol mixture should not be less than about 5 percent.

Although the invention has been described with particularity in the specific preceding example with relation to 1,2-ethylene diamine, other aliphatic diamines, especially those containing vicinal primary amino groups will be singularly effective as potentiators to the reaction of alkali metal permanganates and organic compounds.

The mixture of components described above may be utilized in the device generally described in United States application Ser. No. 802,308, filed contemporaneously with this application on Jan. 24, 1969.

It is intended that this invention only be limited by the scope of the claims which follow.

We claim:

1. A method of potentiating the reaction of an alkali metal permanganate and an organic compound selected from the group consisting of ethylene glycol, glycerin, pyrogallol, gallic acid, benzaldehyde, formaldehyde, 2,4-pentanedione, acetone, aniline, and hexamethylenetetramine comprising the step of adding an aliphatic diamine to the organic compound before intermixing with the permanganate.

2. The method as set forth in claim 1, the diamine being 1,2-ethylene diamine.

3. The method as set forth in claim 2, the permanganate being potassium permanganate and the organic compound being a polyol selected from the group consisting of ethylene glycol and glycerin.

4. The method as set forth in claim 3, the polyol and diamine when intermixed being in a ratio such as to contain at least 5 percent diamine.

5. The method as set forth in claim 4, the mixture of polyol and diamine being about 5 percent diamine and about 95 percent polyol.

6. An explosive device containing separated compartments, one compartment containing an alkali metal permanganate, the other compartment containing an organic compound selected from the group consisting of ethylene glycol, glycerin, pyrogallol, gallic acid, benzaldehyde, formaldehyde, 2,4-pentanedione, acetone, aniline, and hexamethylenetetramine and an aliphatic diamine.

7. The device as set forth in claim 6, the diamine being 1,2-ethylene diamine.

8. The device as set forth in claim 7, the permanganate being potassium permanganate and the organic compound being a polyol selected from the group consisting of ethylene glycol and glycerin.

9. The device as set forth in claim 8, the polyol and diamine when intermixed being in a ratio such as to contain at least 5 percent diamine.

10. The device as set forth in claim 9, the mixture of polyol and diamine being about 5 percent diamine and about 95 percent polyol.

* * * * *